Oct. 22, 1957

C. BANCROFT 2,810,371

ROTARY PISTON GAS GENERATOR

Filed Sept. 21, 1956

INVENTOR.
CHARLES BANCROFT
BY
Kenyon & Kenyon
ATTORNEYS

Oct. 22, 1957 C. BANCROFT 2,810,371
ROTARY PISTON GAS GENERATOR
Filed Sept. 21, 1956 7 Sheets-Sheet 5

INVENTOR.
CHARLES BANCROFT
BY
*Kenyon & Kenyon*
ATTORNEYS

Oct. 22, 1957     C. BANCROFT     2,810,371
ROTARY PISTON GAS GENERATOR

Filed Sept. 21, 1956     7 Sheets-Sheet 7

INVENTOR.
CHARLES BANCROFT
BY
ATTORNEYS

United States Patent Office 2,810,371
Patented Oct. 22, 1957

2,810,371

ROTARY PISTON GAS GENERATOR

Charles Bancroft, New Canaan, Conn.

Application September 21, 1956, Serial No. 611,133

16 Claims. (Cl. 123—11)

This invention relates to gas generators such as are used to convert a combustible gas mixture to a supply of fluid under pressure. Devices of this character are used to power turbines and for other purposes.

One of the objects is to provide a gas generator in a form providing an unusually large output for its physical overall size. Attainment of this obect is desirable in the transportation fields in particular. For example, a gas generator having these advantages is needed for the application of turbine drives to automobile use.

Another object is to provide a gas generator in a form free from valves of a type subject to noise or mechanical failure. Still another object is to provide a gas generator in a form combining the advantages of a positive displacement type of device with those of a rotary centrifugal type.

The invention makes use of the alternately accelerating and decelerating, rotary or vane piston type of device. Heretofore this type of device has been considered for use as either an engine or a pump. One of its disadvantages has been that the centrifugal action exerted on the gases or other fluid handled, causes severe complications in connection with feeding the gases or fluids to or from the working chamber spaces. Another problem was the mechanical construction of the parts required not only to regulate the rotary piston action but also to transmit rotary power either to or from the pistons. The dissipation of heat introduced still another problem.

According to the present invention the above problems are substantially eliminated while retaining the known advantage of such a rotary piston device, namely, unusually large displacement for the physical dimensions involved.

With the above in mind the present invention is featured by the use of inner and outer, concentrically arranged, rotary piston assemblies of the accelerating and decelerating piston type previously mentioned. The inner assembly is arranged to draw in a gas at the axis of this assembly. The inner assembly of pistons provides a means for drawing in the gas and for compressing it. The rotation of the pistons at high speeds introduces centrifugal force which was previously considered to be a disadvantage. However, this inner assembly has outlet ports at its outer periphery feeding axially into the outer assembly, so the centrifugal force in this case functions as an effective means for applying force to the gas.

As it is introduced to the outer assembly the gas is caused to thermally expand. This may be done by providing the gas originally in the form of a combustible mixture and causing it to ignite while entering the outer assembly, or air may comprise the input and solid fuel may be injected at the proper time to create the necessary heat. Other means for producing the thermal expansion may be used.

In the outer assembly the expanding gases serve to power the device, the inner and outer assemblies being mechanically interconnected, and the rotary pistons are arranged so that one cooperating set is driven to separation beyond the expansion of the gas, within the working space the set defines, at which time this space connects with the outer atmosphere so as to draw in more air. Thereafter this piston set causes a decrease in the chamber space and, as in the case of the inner assembly, the discharge is at the outer periphery so that the output is not only the result of the positive displacement of the two pistons moving together but also the result of the centrifugal action when the device operates at high speed.

It can be seen that what was a defect before is now used to advantage. Efficiency is not only increased but the rotary piston type of device is increased in practicability. Since the parts required to mechanically interconnect the various pistons are not placed under the stress of transmitting power to an external load, the problem of mechanical design is greatly alleviated. In this connection also the problem is reduced because the forces produced by the expansion of the hot gases are considerably balanced out by the consumption of this force connected with compressing the gases to produce the output aided by the centrifugal action.

The heat problem is considerably alleviated because of the cooling effect obtained by the introduction of the atmospheric air to the chamber spaces which continue to increase in volume after the limit of the thermal expansion is reached and prior to the decrease in this volume during the output phase.

A specific example of one form of the present invention is illustrated by the accompanying drawings in which.

Figure 1:
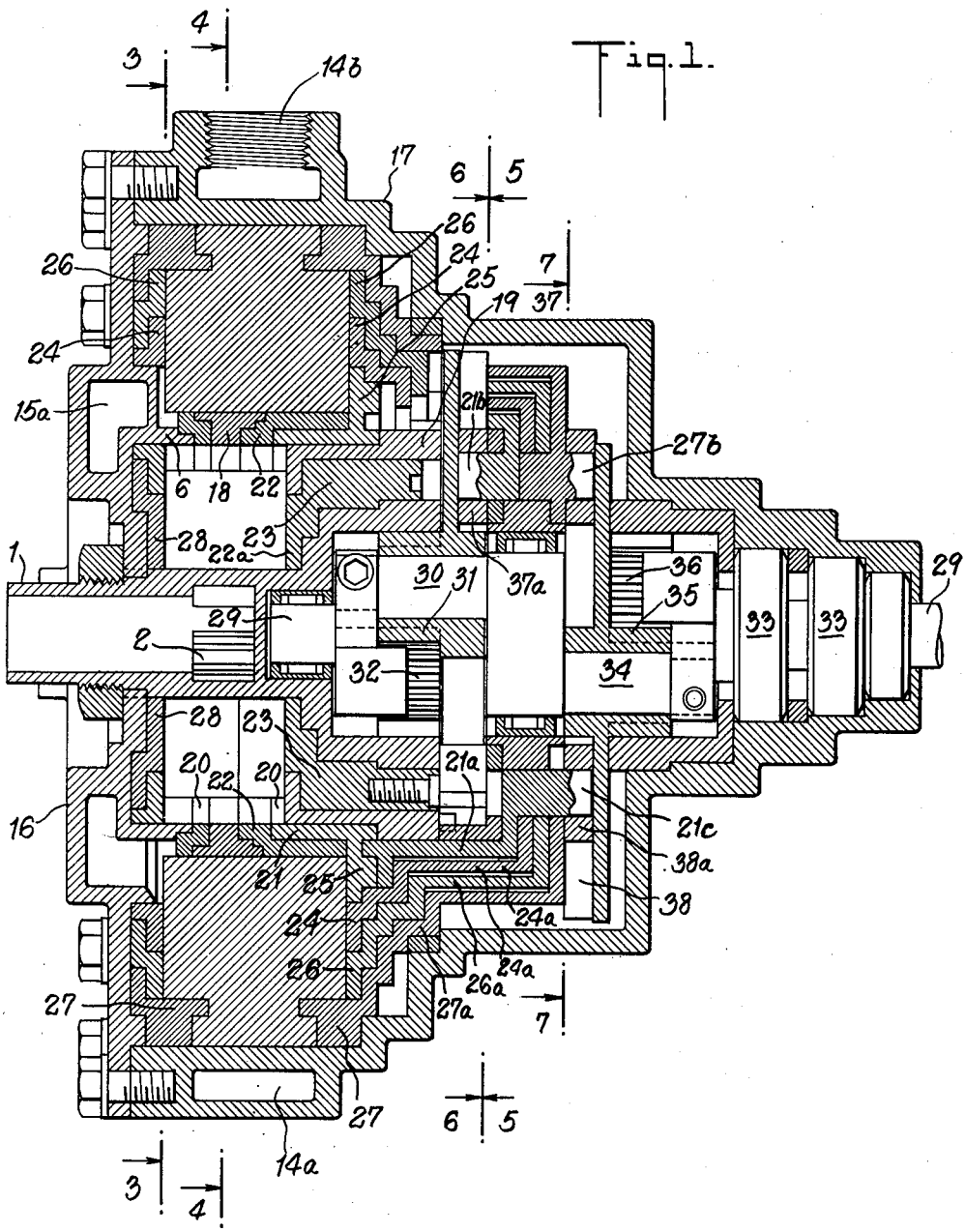
Fig. 1 is a longitudinal section taken on a vertical plane.
Figure 2:
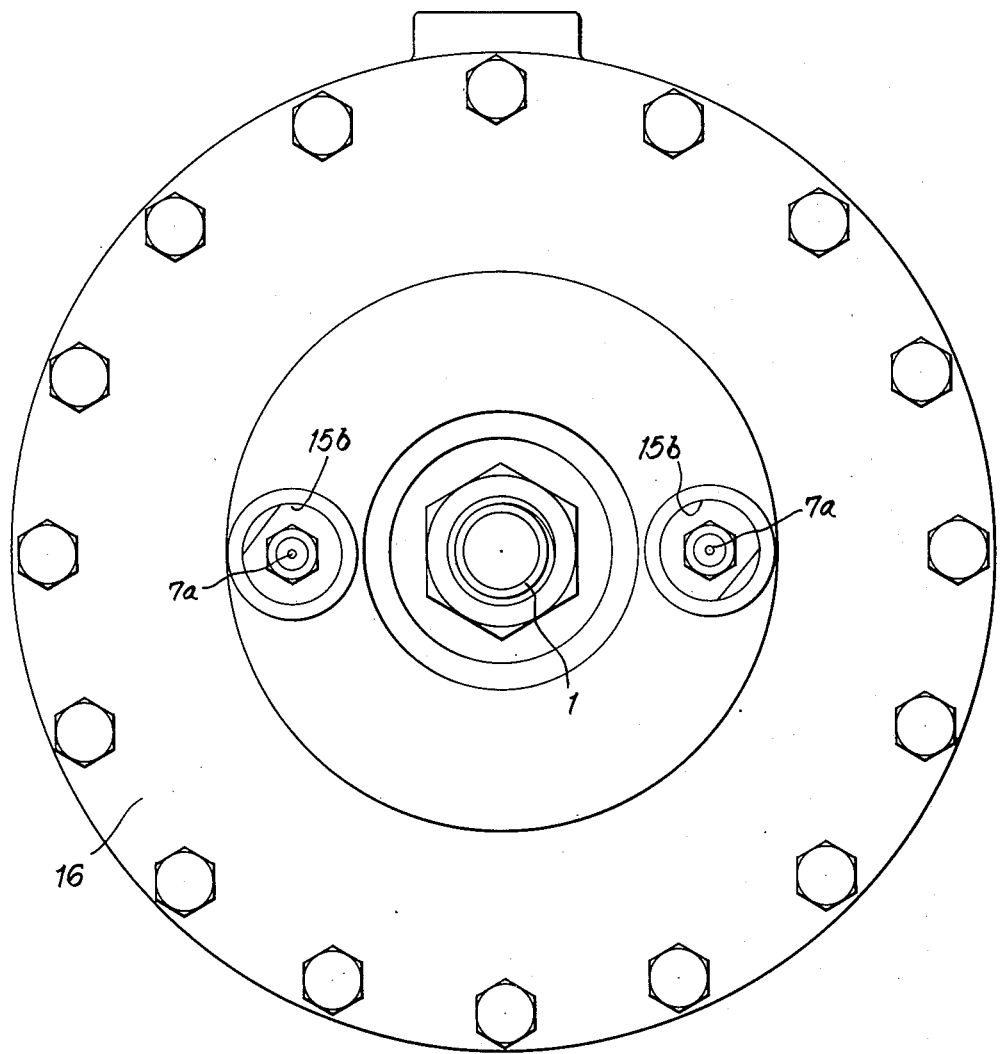
Fig. 2 is an end view of the device looking at what is the left-hand end in Fig. 1.
Figure 3:
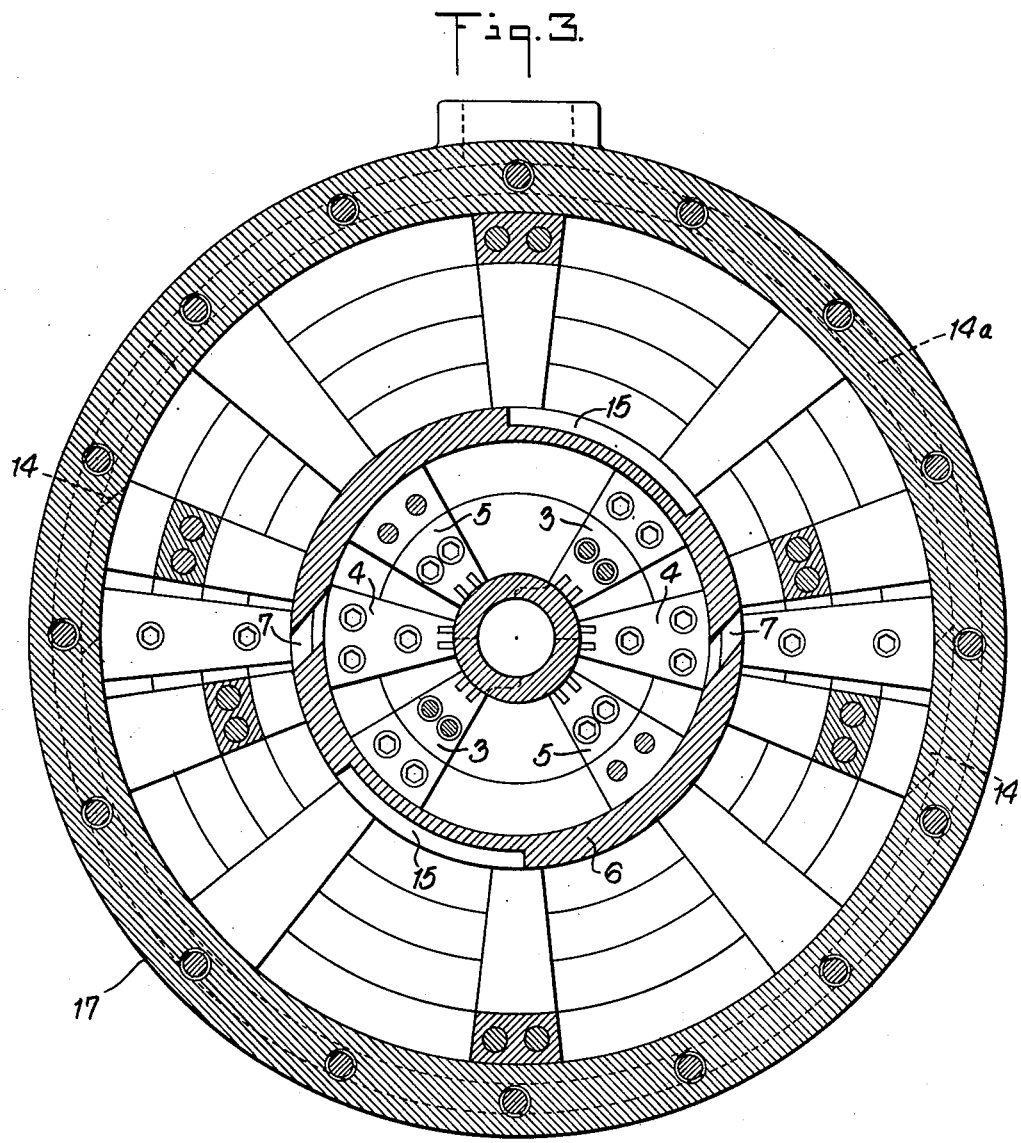
Fig. 3 is a cross section taken on the line 3—3 in Fig. 1.
Figure 4:
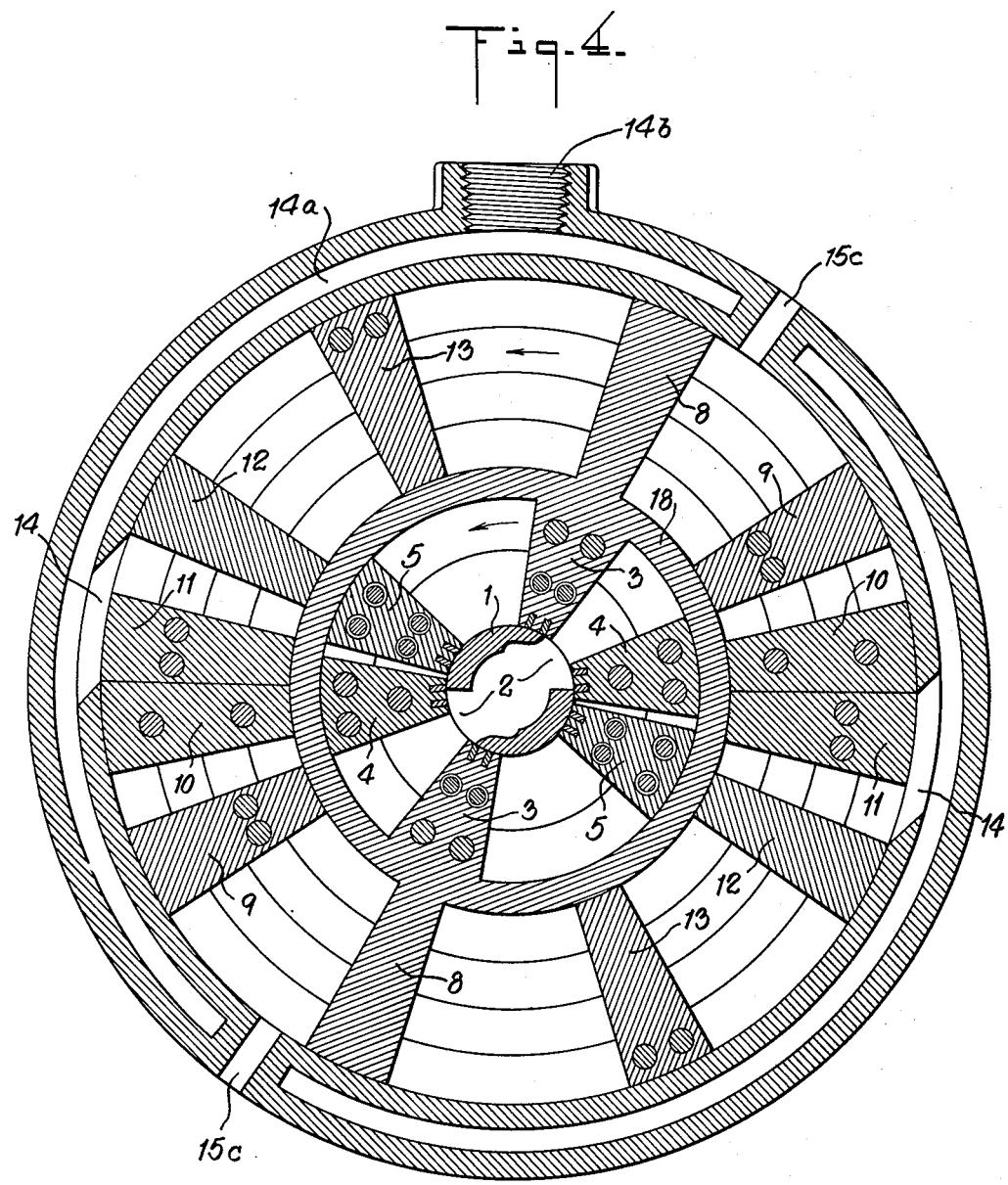
Fig. 4 is a cross section taken on the line 4—4 in Fig. 1, this view showing the rotary pistons during a different phase than is illustrated by the balance of the drawings.
Figure 5:
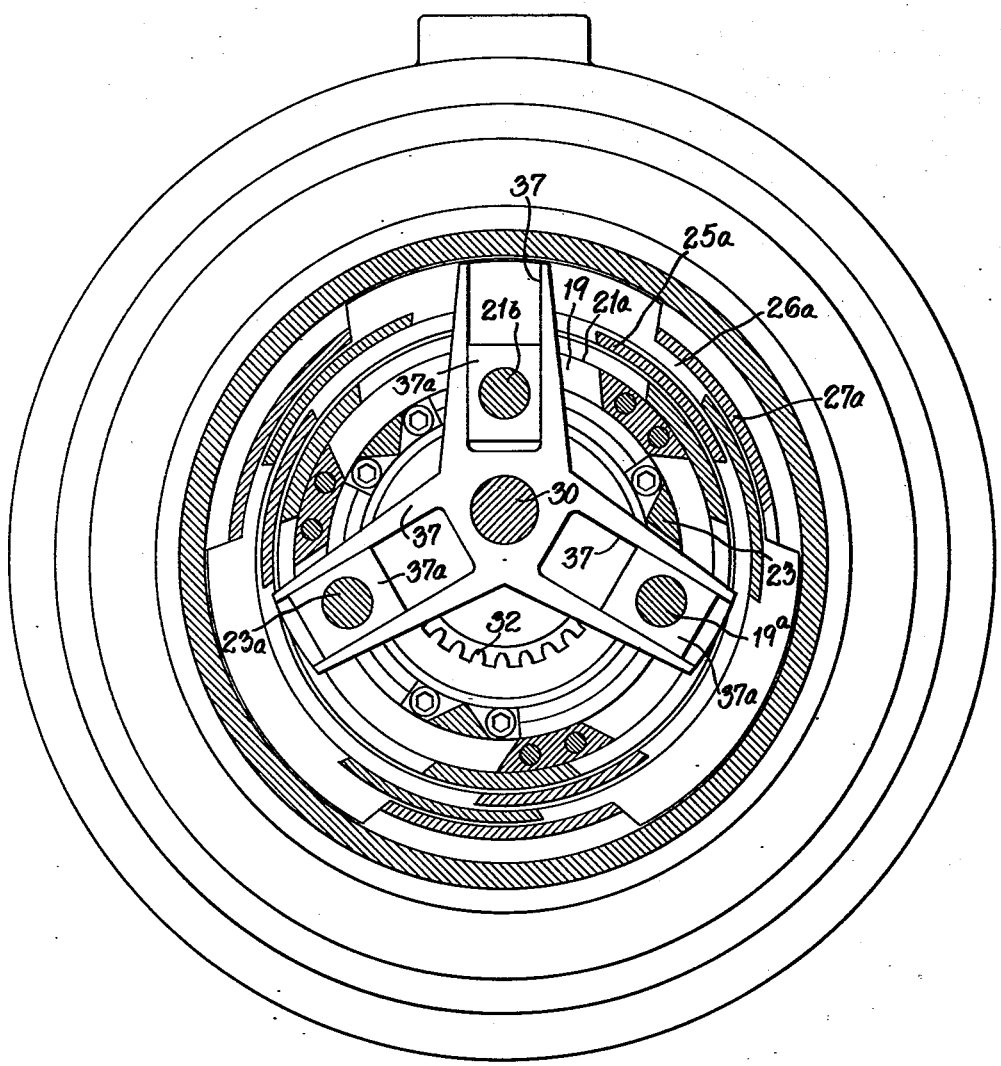
Fig. 5 is a cross section taken on the line 5—5 in Fig. 1.
Figure 6:
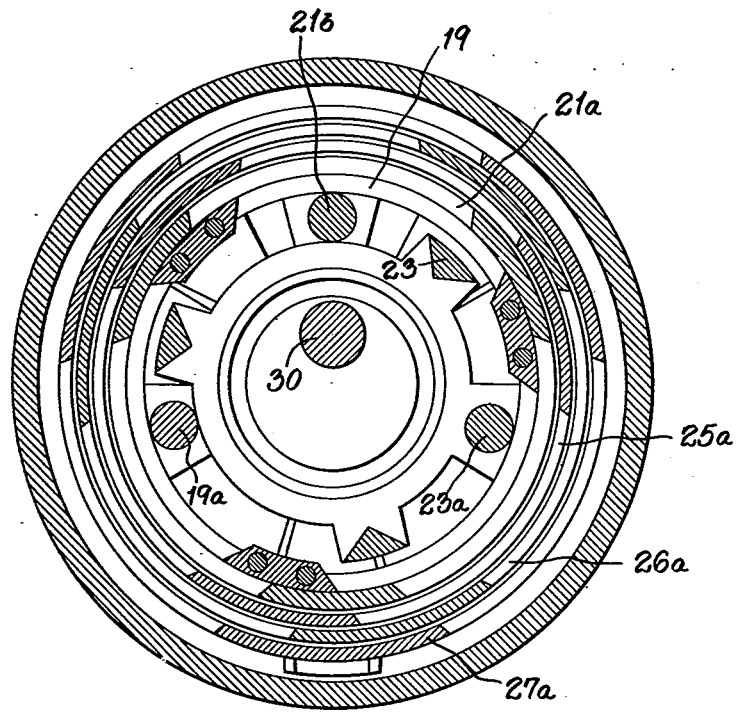
Fig. 6 is a cross section taken on the line 6—6 in Fig. 1.
Figure 7:
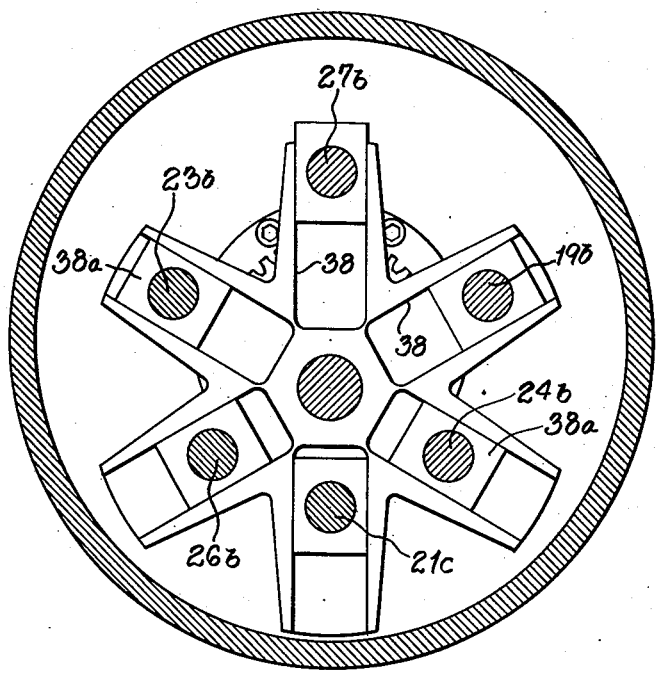
Fig. 7 is a cross section taken on the line 7—7 in Fig. 1.

These drawings show the axial air or gas inlet in the form of a generally tubular member 1 having oppositely located radial ports 2 for the inner piston assembly. The latter includes three pairs of rotary pistons 3, 4 and 5, each pair comprising diametrically opposite rotary pistons internally bearing against the periphery of the member 1. In the drawings the pistons are decelerating to a minimum velocity when they occupy a horizontal plane and are accelerating to a maximum velocity when they reach a vertical plane. Thus, in Fig. 4, it can be seen that the pistons 3 and 4 are drawing in a charge of air.

The rotary pistons, of course, operate in an annular chamber, the details of which are described hereinafter. The inner annular wall is formed by the tubular member 1 and the outer annular wall is formed in part by a short tubular member 6 of appropriately larger diameter than the tubular member 1. Both of the members 1 and 6 are stationary or non-rotative in the operation of the device.

Gases drawn into the inner assembly are compressed by the latter and thrown radially outwardly by centrifugal force and at the locations where the inner assembly pistons attain their minimum displacement the tubular member 6 is provided with ports 7 through which the gases are pushed by displacement action and thrown by centrifugal force.

The outer piston assembly is formed by six pairs of rotary pistons 8, 9, 10, 11, 12 and 13. These pistons of the outer assembly, like those of the inner assembly, decrease in velocity to a minimum when they occupy a horizontal position and increase to a maximum velocity when they are located in a vertical plane. It can be seen that the gases when thrown into the outer piston assembly by centrifugal force continue radially outwardly, the outer piston assembly being provided with outlet ports 14 through which the gas finally passes.

The previously described thermal expansion is effected either by igniting the gases passing through the ports 7, when a combustible mixture is fed to the device, or by the solid injection of fuel at these ports if the device is receiving air only. Other means for heating the gases at this point may also be used.

The ports 7 are located substantially on a horizontal plane so that the hot gases drive between the pistons of the outer assembly when these pistons are just beginning to separate, the thermal expansion of the gases driving these pistons apart and powering the device. Shortly thereafter as the pistons continue to separate thermal expansion is no longer available because it has reached its maximum and the pistons then continue to separate so as to create a vacuum and draw in fresh air as previously described. The outer air is fed between the pistons through ports 15. The ports 15 terminate at locations where the pistons begin to decelerate so as to approach each other and, thereafter, the pistons apply compression to the expanded gas increased in volume by the fresh air, until the ports 14 are reached.

In addition to the advantages previously noted it is to be observed that the phasing of the actions of the inner and outer piston assemblies, relative to each other, is such that, generally speaking, substantially radially aligned displacement chambers are always in substantially the same phase of operation so that the pressure differentials existing between the inner and outer assemblies are kept at a minimum. This is of advantage in reducing the problem of leakage between the two assemblies.

It is also to be noted that the operation of the device is balanced or symmetric or, in other words, for either of the assemblies compression on one side of the assembly is occurring in the same fashion on the diametrically opposite side, as is also true in the case of all other operating phases. This permits the stresses to be balanced against each other to a considerable degree.

The details of the device follow:

The tubular member 1 is mounted immovably in the center of a circular end plate 16 which is peripherally attached to an annular casing 17. The pistons 3 and 8 are part of an integral member which provides an annular wall segment 18 which connects integrally with a tubular shaft 19. Thus rotation of the shaft 19 effects rotation of both the pistons 3 and 8.

The pistons 4 connect with annular wall members 20 which in turn connect with a tubular shaft 21, and the pistons 5 connect with the annular wall member 22 which connects with a tubular shaft 23 through a flange member 22a.

Going to the outer assembly, the pistons 9 connect with a side wall ring 24. The pistons 10 connect with side wall ring 25 which connects with the tubular shaft 21 and with the forward one of the wall rings 20. The pistons 11 connect with side wall rings 26. The pistons 12 connect with the annular wall member 22 and, therefore, with the tubular shaft 23. Finally, the pistons 13 are connected with side wall members 27.

It can be seen from the above that the annular chambers in which the rotary pistons operate are provided by a number of annular elements which both serve to define the chambers and also to provide the connections required to operate the various pistons. Arrangements of this sort are used generally to provide a completely enclosed chamber space, the pistons 3, for example, connecting with a flange 28 to provide a front end. Due to this arrangement the side walls of the chamber and the annular wall separating the two chambers of the inner and outer assemblies all rotate in the same direction as do the various pistons in practically all instances. Although different velocities are involved the net effect is a very substantial reduction in the friction between the rotary pistons and what would otherwise be stationary wall members. Wall areas of individual pistons have substantially equal area on each side of the annular chamber to avoid lateral thrust resulting from pressures within the cylinders. The details of this general kind of arrangement are disclosed by the prior art.

The tubular member 1 extends inwardly beyond the inner piston assembly and mounts a bearing for the crankshaft 29 required by devices of this type to control the piston action. The crankshaft 29 has a crankpin 30 on which a pinion 31 is journaled, the tubular member 1 having an enlarged inner end mounting an internal ring gear 32 with which the pinion 31 is meshed. The rear end of the crankshaft 29 is journaled by bearings 33 mounted within the rear extension in the casing 17. The crank has a second pin 34 providing a throw opposite to that of the crankpin 30 and a second pinion 35 is journaled on this pin 34, the internal ring gear 36 with which this pinion 35 meshes being mounted within the casing 17. Both the ring gears 32 and 36 are stationarily held with respect to the casing so as to rotate the pinions 31 and 35 when the crank turns.

The pinion 31 integrally connects with three radial guideways 37 and the pinion 35 integrally connects with six radial guideways 38. Pillow blocks 37a ride in the guideways 37 and pillow blocks 38a ride in the guideways 38. These assemblies of pinions, radial guideways and their sliding pillow blocks provide the connecting members required to control the action of the pistons as the connecting members revolve on their axes about the axis of the crankshaft.

The connections between the various pistons and the connecting members with the crankshaft are as follows:

The tubular shaft member 21 connects with a tubular extension 21a which extends to the crankpins 21b and 21c which are journaled to the appropriate ones of the pillow blocks 37a and 38a. The tubular shaft 19 connects with the piston pins 19a and 19b of the appropriate pillow blocks 37a and 38a. The tubular shaft 23 connects with the piston pins 23a and 23b of the appropriate pillow blocks 37a and 38a.

Going now to the outer piston assembly, the previously described side wall ring segments 24, 26 and 27 connect with three large tubular shafts or drums 24a, 26a and 27a and these tubular shafts and drums have inwardly extending end members which connect with the pins 24b, 26b and 27b journaled in the appropriate ones of the pillow blocks 38a.

Obviously the various tubular shafts and drums described necessarily have various cut-away portions wherever clearance is required by the operating conditions of the parts. The control of rotary pistons in the fashion described is old in the art and, therefore, has been described briefly. The construction illustrated is of the balanced type required to balance out the stresses involved. A more detailed description of the old principles involved would unnecessarily complicate the present disclosure.

As shown by the drawings, in every instance each piston is diametrically balanced with respect to the annular chamber in which it rotates. In other words, each piston appears in duplicate or as a pair which work together. Therefore, the spaces defined between the pistons operate in a diametrically balanced manner. Thus, compression between two pistons on one side is balanced by corresponding compression on the opposite side and the operation is symmetric. In this manner the bearing loads on the rotating parts is reduced.

The previously described ports 15 connect with an annular manifold 15a formed in the end plate 16 and this manifold connects with the outer atmosphere by way of two inlet ports 15b which are arranged substantially in registration with the ports 7. This arrangement is selected so that the ports 15b provide openings for the insertion of ignition means 7a for the ports 7. This has the advantage that the large amount of air consumed by the device is passed around the ignition means 7a so as to provide cooling for such means. The annular manifold 15a provides cooling throughout the zone where the maximum heat is concentrated. The ignition means 7a may comprise spark plugs in case the mixture fed to the device is combustible. Because timing is not required glow plugs may be used instead of spark plugs. In the case of fuel injection the fuel may be injected at these points continuously although not necessarily so.

If a cooler operating device is desired ports 15c may be formed at locations within the zone where the ports 15 open between the pistons. These ports 15c are formed in the outer annular wall of the chamber so that the centrifugal action will aid in causing the discharge of the hot products of combustion, fresh air flooding in through the ports 15 so as to keep the displacement area filled with air at all times.

The casing 17 has an annular manifold 14a formed in it and into which the outlet ports 14 open, this manifold 14a connecting with the outlet 14b which provides the outlet for the gas under pressure. The annular chamber 14a also serves to provide a peripheral heat exchanger for the outer wall of the outer piston assembly, which tends to equalize the temperature of this outer wall peripherally.

It is to be understood that the device may be started by applying rotating power to the shaft 29, the rear end of this shaft projecting through the adjacent end of the casing 17. If desired a part of the power produced by the engine may be taken off from the crankshaft 29. The casing 17 surrounds all of the parts connecting the pistons with the crankshaft, and the space within the casing and behind or outside of the piston assemblies may be used as a lubricant reservoir or enclosure to assure proper lubrication of the various working parts.

I claim:

1. A rotary piston device including inner and outer, concentrically arranged, rotary piston assemblies of the accelerating and decelerating piston type, means for introducing fluid to said inner assembly at its inner periphery, said inner assembly compressing said fluid and centrifugally throwing it radially outwardly, means for passing said fluid radially outwardly from the outer periphery of said inner assembly and into the inner periphery of said outer assembly, said outer assembly also compressing said fluid and centrifugally throwing it radially outwardly, and means for passing said fluid radially outwardly from said outer assembly.

2. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly.

3. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said inner and outer assemblies having means for rotatively interconnecting them so that said outer assembly drives said inner assembly.

4. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said outer assembly having means for connecting the space between its pistons with the outer atmosphere when its said pistons are driven to separation beyond the expansion limits of said heated gas passed thereto from said inner assembly and until its said pistons begin to approach each other to effect compression.

5. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said inner and outer assemblies having means for rotatively interconnecting them so that said outer assembly drives said inner assembly, said outer assembly having means for connecting the space between its pistons with the outer atmosphere when its said pistons are driven to separation beyond the expansion limits of said heated gas passed thereto from said inner assembly and until its said pistons begin to approach each other to effect compression.

6. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, the second-named means including an ignition means, said gas being a combustible mixture when fed to said inner assembly.

7. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, the second-named means including a fuel injector means, said gas containing oxygen when fed to said inner assembly.

8. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said inner and outer assemblies having means for rotatively interconnecting them so that said outer assembly drives said inner assembly, said interconnecting means phasing said assemblies substantially similarly to reduce the pressure differentials existing between radially aligned portions of said assemblies.

9. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said inner and outer assemblies having means for rotatively interconnecting so that said outer assembly drives said inner assembly, each of said assemblies comprising a multiplicity of pistons and means for interconnecting them for symmetric operation.

10. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said discharging means comprising an annular manifold surrounding said outer assembly closely and having ports connecting the outer periphery of said outer assembly with said manifold.

11. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said outer assembly having means for connecting the space between its pistons with the outer atmosphere when its said pistons are driven to separation beyond the expansion limits of said heated gas passed thereto from said inner assembly and until its said pistons begin to approach each other to effect compression, the last-named means including an annular inlet manifold substantially registered with the zone between the outer and inner peripheries of said inner and outer assemblies respectively.

12. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said outer assembly having means for connecting the space between its pistons with the outer atmosphere when its said pistons are driven to separation beyond the expansion limits of said heated gas passed thereto from said inner assembly and until its said pistons begin to approach each other to effect compression, the last-named means including an annular inlet manifold substantially registered with the zone between the outer and inner peripheries of said inner and outer assemblies respectively, the second-named means including an ignition means, said gas being a combustible gas when fed to said inner assembly, said inlet manifold having inlet ports registered with said ignition means and the latter being at least partly within said inlet manifold.

13. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said outer assembly having means for connecting the space between its pistons with the outer atmosphere when its said pistons are driven to separation beyond the expansion limits of said heated gas passed thereto from said inner assembly and until its said pistons begin to approach each other to effect compression, the last-named means including an annular inlet manifold substantially registered with the zone between the outer and inner peripheries of said inner and outer assemblies respectively, the second-named means including a fuel injector means, said gas containing oxygen when fed to said inner assembly, said inlet manifold having inlet ports registered with said injector means and the latter being at least partly within said inlet manifold.

14. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said assembly having means for connecting the space between its pistons with the outer atmosphere when its said pistons are driven to separation beyond the expansion limits of said heated gas passed thereto from said inner assembly and until its said pistons begin to approach each other to effect compression, the just said connecting means connecting with the inner periphery of said outer assembly, and means for connecting said space with the outer atmosphere at the outer periphery of said outer assembly while this said connecting means is operative.

15. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said piston assemblies being of the balanced symmetric piston type.

16. A rotary piston gas generator including inner and outer, concentrically arranged, rotary piston assemblies of the accelerating and decelerating piston type, means for feeding a gas to said inner assembly at its inner periphery, said inner assembly compressing said gas and centrifugally throwing it radially outwardly, means for passing said gas radially from the outer periphery of said inner assembly to the inner periphery of said outer assembly while heating said gas to cause its thermal expansion, said outer assembly further compressing said gas and centrifugally throwing it outwardly, and means for discharging said gas radially outwardly from the outer periphery of said outer assembly, said outer assembly having means for connecting the space between its pistons with the outer atmosphere when its said pistons are driven to separation beyond the expansion limits of said heated gas passed thereto from said inner assembly and until its said pistons begin to approach each other to effect compression.

No references cited.